G. M. BARNES.
FRAME FOR LANDING NETS.
APPLICATION FILED NOV. 4, 1908.
939,381.
Patented Nov. 9, 1909.
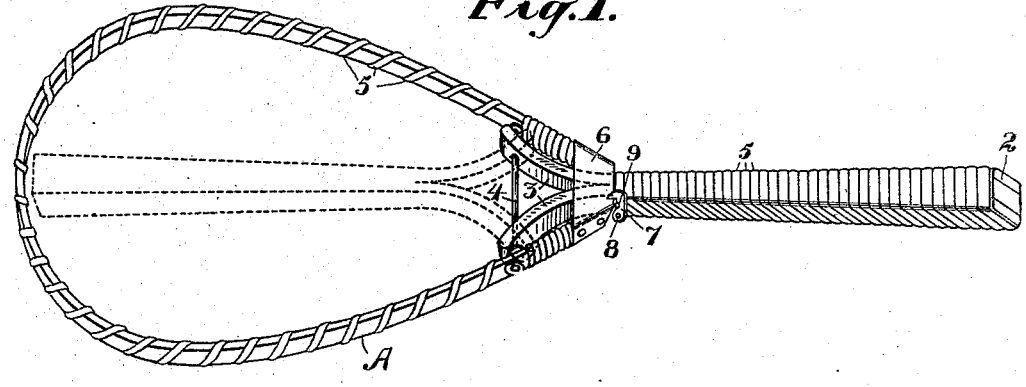
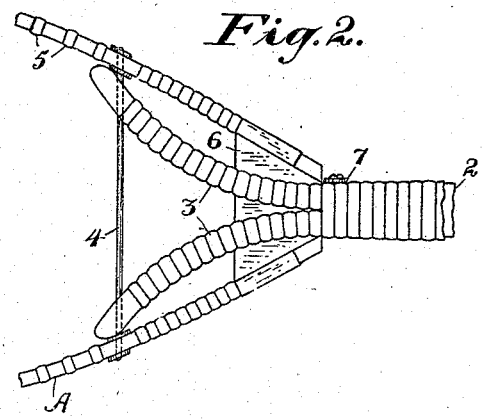 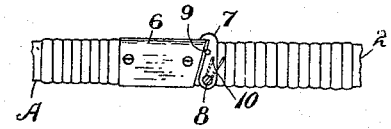
WITNESSES:
F. H. Fliedner
Chas Sonntag
INVENTOR
George M. Barnes,
BY
Lincoln Sonntag
ATTORNEY

UNITED STATES PATENT OFFICE.

GEORGE M. BARNES, OF MILL VALLEY, CALIFORNIA, ASSIGNOR TO CARLOS G. YOUNG, OF BERKELEY, CALIFORNIA.

FRAME FOR LANDING-NETS.

939,381.          Specification of Letters Patent.        Patented Nov. 9, 1909.

Application filed November 4, 1908. Serial No. 460,984.

*To all whom it may concern:*

Be it known that I, GEORGE M. BARNES, a citizen of the United States, residing at Mill Valley, in the county of Marin and State of California, have invented certain new and useful Improvements in Frames for Landing-Nets, of which the following is a specification.

My invention relates to improvements in frames for landing nets as used in angling.

The object of my invention is to provide a frame for landing nets and provided with a handle used in angling, which can be folded to facilitate the carrying or packing thereof; which when the frame is folded or closed, the handle can be seized by the hand and the frame itself thrown forward, whereby it will open and lock in its working position and which combines, simplicity, strength and ease of operation.

My invention consists in the novel combination and arrangement of parts shown in the accompanying drawing, described in the following specification and claimed in the appended claim.

In the drawings Figure 1 is a perspective view of my said frame showing the handle thereof in dotted lines, when the same is inclosed by the frame. Fig. 2 is an enlarged view of one end of the frame and of the handle to show the manner in which said device is pivoted and engages the frame. Fig. 3 is a view of part of the handle and frame showing the locking device and the manner in which said device is pivoted and engages the frame.

In the figures A is a view of the frame shown in position for use.

2 shows the handle of the frame.

3 shows the curved end branches of the handle as hinged to the cross-rod 4.

5 shows the wrappings of the handle and frame.

6 designates the end plate of the frame which extends horizontally from one edge thereof to the opposite edge and is bent around the side of the frame to secure the same.

7 indicates the catch and 8 the pivot on which the catch turns and 9 shows the stop engaging a notch in the catch.

10 indicates the spring which keeps the catch in position when the frame is extended for use, the catch engaging the plate 6 for said purpose. When the handle is so extended the branches of the handle repose within the frame and contact with the plate at the point of their commencement.

When the handle is extended longitudinally from the frame so that the device is in the position for use the bent portion of the catch engages the inner end of the frame A and holds it firmly in such position. The mere pressing outwardly of the catch releases the handle so that it can be turned in the opposite position until it reposes within the frame, resting in alinement with the sides of such frame.

Should one hand of the angler be engaged in other work the handle of the frame may be seized with the other hand when the frame is closed and by a throwing movement while the handle is grasped the device may be extended.

Having thus described my invention what I claim as new and desire to secure by Letters Patent is:—

A frame for landing nets having a plate covering one side of its inner end, a handle having spreading branches hinged in said end, said branches reposing within the walls of said frame when the handle is extended, and a catch pivotally secured to said handle and arranged to engage said plate.

In testimony whereof I affix my signature, in presence of two witnesses.

GEORGE M. BARNES.

Witnesses:
     ANNE F. HASTY,
     LINCOLN SOUNTAG.